CARRIER WAVE MODULATORS AND DEMODULATORS

Filed Oct. 28, 1957

Inventor
J. G. Willis
By [signature]
Attorney

United States Patent Office 2,943,271

Patented June 28, 1960

2,943,271

CARRIER WAVE MODULATORS AND DEMODULATORS

John Gordon Willis, London, England, assignor to International Standard Electric Corporation, New York, N.Y., a corporation of Delaware Filed Oct. 28, 1957, Ser. No. 692,805

Claims priority, application Great Britain Nov. 8, 1956

4 Claims. (Cl. 332—31)

Figures 1, 2, 3, 4:
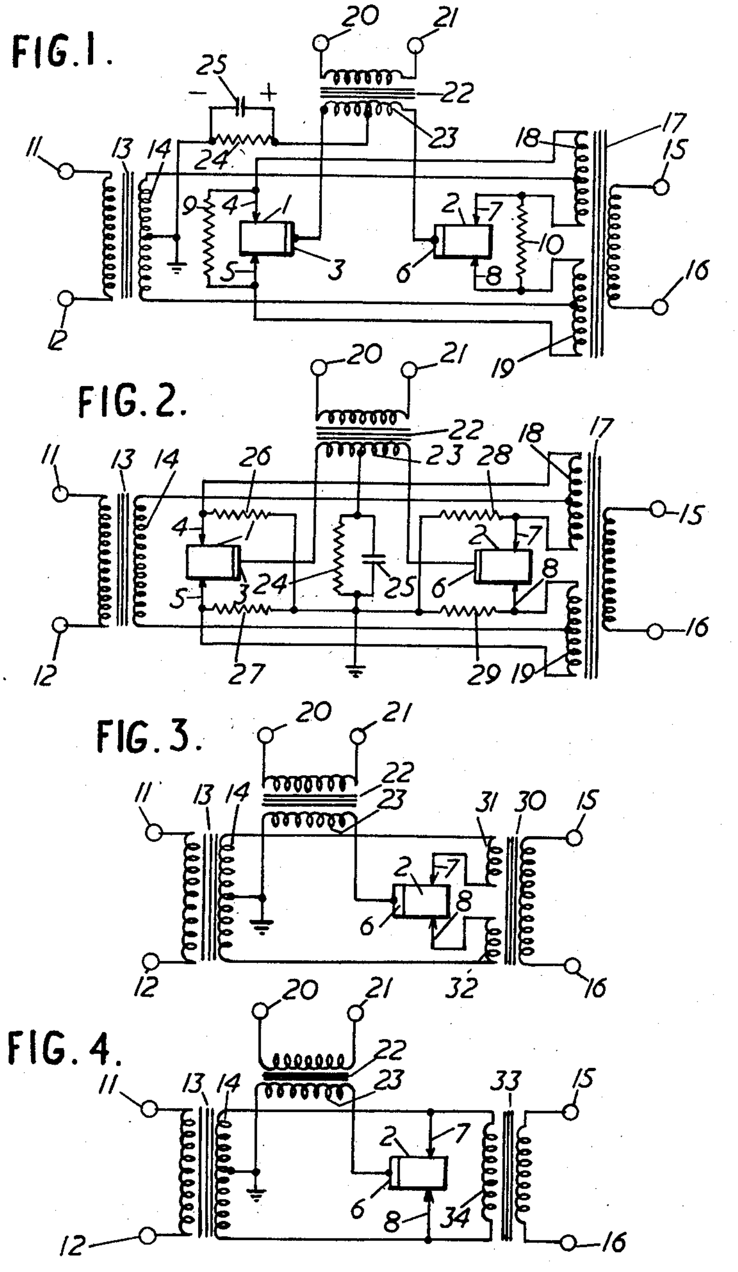

The present invention relates to carrier wave modulators and demodulators.

A number of modulator and demodulator circuits are known in which crystal rectifiers, or groups of crystal rectifiers, are used effectively as switches controlled by the carrier wave source, and periodically interrupt, or reverse the connections of, the circuit through which the waves to be modulated or demodulated are passed.

It has been found that the emitter-collector circuit of a symmetrical junction transistor forms a very efficient switch when controlled by switching currents supplied to the base electrode, and it is the object of the present invention to provide a modulator or demodulator circuit in which the usual rectifiers are replaced by transistors.

While in the case of a symmetrical junction transistor, the emitter and collector electrodes and contacts are distinguishable from one another only by the manner in which they are polarised (that is, each electrode can be regarded as an emitter electrode when it is polarised positively to the base electrode, and as a collector electrode when it is polarised negatively to the base electrode, in the case of a transistor with a body consisting of N-type germanium), for convenience, the two electrodes will be referred to below respectively as emitter and collector electrodes, without implying any difference between them.

The principal advantage of using transistors instead of rectifiers is that the power necessary to control a transistor is much less than that required to control a corresponding rectifier or group of rectifiers. It follows that under equivalent conditions, the carrier leak in a balanced modulator is much less when transistors are used. It is also notable that a transistor modulator generally has fewer transistors than the equivalent rectifier modulator has rectifiers.

The above-stated object is achieved according to the invention by providing a carrier wave modulator or demodulator comprising a circuit connecting a pair of input terminals to a pair of output terminals, the said circuit including the collector-emitter impedance of a symmetrical transistor, means for supplying a train of waves to the said input terminals, means for applying a train of carrier waves periodically to block and unblock the transistor in such manner that the said circuit is periodically effectively interrupted or short-circuited, and means for deriving sideband waves from the said output terminals.

The inevntion also provides a carrier wave modulator or demodulator comprising a first transformer having first and second windings, a second transformer having third and fourth equal windings each with a centre tap, and a fifth winding, the terminals of the said second winding being connected respectively to the said centre taps, two similar symmetrical transistors the collector and emitter electrodes of one transistor being connected respectively to one terminal of each of the third and fourth windings, and the collector and emitter electrodes of the second transistor being connected respectively to the remaining terminals of the said third and fourth windings, the connections being such that when either transistor is unblocked a series-aiding connection is made between the said third and fourth windings, a third transformer having sixth and seventh windings, the terminals of the sixth winding being connected respectively to the base electrodes of the two transistors, and the sixth winding having a centre tap having connections to the emitter and collector electrodes of both transistors.

The invention will be described with reference to the accompanying drawing, in which Figs. 1 to 4 show schematic circuit diagrams of four embodiments of the invention.

Fig. 1 shows a balanced modulator according to the invention, which is equivalent to the conventional ring modulator employing four crystal rectifiers arranged in a ring. Instead of the four rectifiers, two symmetrical junction transistors 1, 2 are employed. The transistor 1 comprises, for example, a body of N-type germanium having a base electrode 3 and two additional electrodes 4 and 5 each of which is in contact with a P-type region (not shown) of the body. The electrodes 4 and 5 are similar and symmetrically arranged, and each of them acts as an emitter electrode when it is positive to the base electrode and as a collector electrode when it is negative to the base electrode. The transistor 2 has electrodes 6, 7 and 8 corresponding respectively with the electrodes 3, 4 and 5 of the transistor 1. The electrodes 4, 5 and 7, 8 are respectively shunted by equal resistors 9, 10 of relatively high resistance.

A pair of input terminals 11, 12 are connected to the primary winding of an input transformer 13 having a secondary winding 14, the centre tap of which is connected to ground. A pair of output terminals 15, 16 are connected to the secondary winding of an output transformer 17 having two equal centre-tapped primary windings 18 and 19. These primary windings are so wound that a current flowing from the upper terminal to the lower terminal of each winding produces a magnetic flux in the same direction in the core. The upper and lower terminals of the winding 14 are connected respectively to the centre taps of the windings 18 and 19.

The electrodes 4 and 5 of the transistor 1 are connected respectively to the upper terminal of winding 18 and to the lower terminal of winding 19. The electrodes 7 and 8 of the transistor 2 are connected respectively to the lower terminal of winding 18 and to the upper terminal of winding 19. It will be seen that when either transistor is unblocked, a series-aiding connection is formed between the windings 18 and 19.

A pair of terminals 20, 21 for the carrier wave source (not shown) are connected to the primary winding of a transformer 22, the secondary winding 23 of which has a centre tap connected to the centre tap of winding 14 through a resistor 24 shunted by a capacitor 25. The terminals of the winding 23 are connected respectively to the base electrodes 3 and 6 of the transistors 1 and 2.

A modulating wave, such as a speed wave, is supplied to the input terminals 11 and 12, and a modulation sideband may be selected by a suitable filter (not shown) from the output terminals 15 and 16.

The transistors 1 and 2 being of the P-N-P type, will be blocked that is, the impedance between electrodes 4 and 5 is high, when the base electrode is positive to the emitter and collector electrodes, and unblocked that is, the impedance between electrodes 4 and 5 is low, when the base electrode is negative to these electrodes. Thus it will be seen that for those loops of the carrier wave which make the base electrode 3 positive to ground and the base electrode 6 negative to ground, the transistor 1 will be blocked and the transistor 2 will be unblocked. Thus it will be seen that the connection between the input terminals 11, 12 and the output terminals 15, 16 is principally from the secondary winding 14 and through the lower half of winding 18 and the upper half of winding 19, the path through the other halves of these windings being substantially interrupted by the transistor 1. For the other loops of the carrier wave, transistor 1 will be unblocked and transistor 2 will be blocked, and the connection is now principally through the upper half of the winding 18 and the lower half of the winding 19. If the transformer 17 is wound so that in the first case the connection between the input terminals 11, 12 and the output terminals 15, 16 is such that no phase change occurs, in the second case a phase shift of substantially 180° occurs, because the windings 18 and 19 are traversed by the current in opposite directions in the two cases. The connection between the input terminals 11, 12 and the output terminals 15, 16 is thus periodically reversed by the carrier wave, and so the arrangement operates in the same way as the known ring modulator.

The resistors 9 and 10 are not essential, but are provided for two reasons. First, the capacity between the electrodes 4 and 5 (and 7 and 8) may be appreciable, and it is therefore desirable to shunt it with a resistance sufficiently small to render its effect negligible. Secondly, the modulator is equivalent to a reversing switch arrangement controlled by the carrier waves, but the switches are imperfect because a closed connection does not have a zero impedance and an open connection does not have infinite impedance. This is true of the known ring modulator and also of the modulator described with reference to Fig. 1.

In the case of the well known ring modulator, in which a ring of four rectifiers is used, the input and output impedances of the modulator should be respectively matched to the impedance Z1 of the source of the modulating waves, and to the impedance Z2 of the load to which the output sideband is delivered, over the corresponding frequency bands. Furthermore, the impedance of the source and load at frequencies outside the corresponding bands should be inverse, that is, one should be high and the other low.

It can be shown that if R1 is the resistance of one of the rectifiers when unblocked, and R2 the resistance when blocked, then for most efficient operation R1.R2 should equal Z1.Z2. In the arrangement of Fig. 1, each transistor is substantially equivalent to two of the rectifiers of the known ring modulator connected in series, so that the corresponding closed and open resistances between the emitter and collector electrodes when the transistor is unblocked and blocked are 2R1 and 2R2.

In the case of a symmetrical junction transistor, the closed resistance 2R1 depends on the magnitude of the base current which flows when the transistor is unblocked. In the case of one suitable type of transistor, 2R1 may, for example, be 50 ohms when the base current is of the order of 150 microamperes. In this case, as already mentioned, the base current flows in the direction away from the base electrode. When the transistor is blocked by making the base electrode a few volts positive to the collector and emitter electrodes, the resistance between these electrodes may be of the order of 100 megohms.

In a particular case of a modulator designed according to Fig. 1, Z1 and Z2 were respectively 244 ohms and 600 ohms. Thus taking 2R1=50 ohms it follows from the relation R1.R2=Z1.Z2 that R2=about 5,750 ohms. Thus 2R2=about 11,500 ohms. But since as stated above, the open resistance of the transistor is about 100 megohms, the above condition will be satisfied by shunting each transistor with a resistance of about 11,500 ohms. This is the value which should be chosen for each of the resistors 9 and 10 of Fig. 1 for the particular case assumed above.

The stray capacity which effectively shunts the emitter and collector electrodes of the transistor was about 40 micro-microfarads having an impedance at 100 kilocycles per second of about 39,000 ohms. The resistors 9 and 10 having the value 11,500 ohms will render the effect of this stray capacity substantially negligible.

In the case of the known ring modulator employing a ring of four crystal rectifiers (for example, germanium rectifiers), the current which it is necessary to supply to the rectifiers in order that they may be sufficiently unblocked is very much higher than in the case of the symmetrical junction transistors of Fig. 1. For example, the carrier power which has to be supplied to the crystal rectifiers may be as much as 20 decibels above the signal power. In the case of the transistors it may be of the order of 10 decibels below the signal power. This means that under equivalent conditions the carrier leak may be of the order of 30 decibels lower when transistors are used than when crystal rectifiers are used.

It has been pointed out above that the value of R1 depends on the value of the unblocking base current, and the resistor 24 of Fig. 1 is therefore chosen to produce the desired unblocking base current, for example 150 microamperes. The resistor 24 also assists in sharpening the blocking and unblocking of the transistors 1 and 2, so that the carrier waves acts substantially like a rectangular wave. The capacitor 25 shunting the resistor 24 is provided to store up a small positive bias potential which tends initially to block both rectifiers, and has been found to improve the operation. The use of the capacitor 25 is however not essential.

The modulator shown in Fig. 2 is a slight modification of that shown in Fig. 1 and operates in substantially the same way. Those elements in Fig. 2 which are the same as corresponding elements in Fig. 1 have been given the same designation numbers.

The modification is that the resistors 9 and 10 of Fig. 1 are replaced in Fig. 2 by corresponding pairs of equal resistors 26, 27 and 28, 29. The junction points of resistors 26, 27 and 28, 29 are connected to ground, and the elements 24, 25 are connected to ground instead of to the centre tap of the winding 14, which is not used. Under the conditions stated above, each of the resistors 26 to 29 will have a value about 17,000 ohms. In the case of Fig. 2, the carrier source must evidently be capable of supplying rather more power than in the case of Fig. 1 because the resistors 26 to 29 are in series with the secondary winding 23. With the arrangement of Fig. 2, however, it is not necessary to provide a centre tap on the winding 14. If it is not desired to provide an initial blocking bias for the transistors, the elements 24 and 25 may be omitted, the centre tap of the winding 23 being connected directly to ground.

The modulator shown in Fig. 3 is an equivalent according to the invention of the simple series modulator of known type in which a rectifier or group of rectifiers controlled by the carrier waves periodically interrupts the connection between the input and output terminals of the modulator. In Fig. 3 only one transistor 2 is used. The output transformer 30 has two equal primary windings 31 and 32 which correspond respectively to the lower half of winding 18 and the upper half of winding 19. The terminals of the winding 14 of the input transformer 13 are connected respectively to the upper end of winding 31 and the lower end of winding 32, and the electrodes 7, 8 of the transistor 2 are connected respectively to the lower end of winding 31 and the upper end of winding 32. The winding 23 of the carrier transformer 22 has one terminal connected to the centre tap of winding 14, and to ground, and the other terminal connected to the base electrode 6. In this case the carrier wave periodically blocks and unblocks the transistor 2 so that the connection between the input terminals 11 and 12 and the output terminals 15 and 16 is periodically interrupted. When the transistor is unblocked, a series-aiding connection is formed between the windings 31 and 32. If desired, elements corresponding to 24 and 25 of Fig. 1 may be connected in series with the ground connection of the transformer 23.

Fig. 4 shows the equivalent according to the invention of the simple shunt modulator of known type in which a rectifier or group of rectifiers controlled by the carrier waves periodically short-circuits the connection between the input terminals 11, 12 and the output terminals 15, 16.

Fig. 4 differs from Fig. 3 in that the output transformer 33 has a single primary winding 34 connected to the winding 14 of the input transformer 13, and that the impedance between the electrodes 7 and 8 of the transistor 2 is connected to shunt the windings 14 and 34. The transistor 2 periodically short-circuits the connection between the input terminals 11, 12 and the output terminals 15, 16. If desired, elements corresponding to 24 and 25 of Fig. 1 may be connected in series with the ground connection of the winding 23.

While for clearness it has been assumed that the circuits of Figs. 1 to 4 are modulators, it will be clear to those skilled in the art that they will also act as demodulators or frequency changers if a modulation sideband wave is supplied to the input terminals 11, 12. Furthermore, although terminals 11, 12 have been assumed to be the input terminals, the circuits will operate equally well if 15 and 16 are used as the input terminals.

While the principles of the invention have been described above in connection with specific embodiments, and particular modifications thereof, it is to be clearly understood that this description is made only by way of example and not as a limitation on the scope of the invention.

What I claim is:

1. A carrier wave modulator or demodulator comprising a first transformer having first and second windings, a second transformer having third and fourth equal windings each with a centre tap, and a fifth winding, the terminals of the said second winding being connected respectively to the said centre taps, two similar symmetrical transistors the collector and emitter electrodes of one transistor being connected respectively to one terminal of each of the said third and fourth windings, and the collector and emitter electrodes of the second transistor being connected respectively to the remaining terminals of the said third and fourth windings, the connections being such that when either transistor is unblocked a series-aiding connection is made between the said third and fourth windings, a third transformer having sixth and seventh windings, the terminals of the sixth winding being connected respectively to the base electrodes of the two transistors, and the sixth winding having a centre tap having connections to the emitter and collector electrodes of both transistors.

2. A modulator or demodulator according to claim 1 comprising a connection between the centre tap of the said sixth winding and the centre point of the said second winding.

3. A modulator or demodulator according to claim 2 comprising two equal resistors each of which is connected between the collector and emitter electrodes of a corresponding one of the said transistors.

4. A modulator or demodulator according to claim 2 in which the said connection includes a resistor shunted by a capacitor.

References Cited in the file of this patent

UNITED STATES PATENTS

| | | |
|---|---|---|
| 1,998,119 | Cox | Apr. 16, 1935 |
| 2,304,135 | Wise | Dec. 8, 1942 |
| 2,691,073 | Lowman | Oct. 5, 1954 |
| 2,816,238 | Elliott | Dec. 10, 1957 |
| 2,862,171 | Freeborn | Nov. 25, 1958 |

FOREIGN PATENTS

| | | |
|---|---|---|
| 504,300 | Great Britain | Apr. 24, 1936 |
| 521,313 | Great Britain | May 17, 1940 |

OTHER REFERENCES

Pub. I, Electronics, article by Chow and Suran, Nov. 1953, p. 189.